US006810361B1

(12) United States Patent
Anderson

(10) Patent No.: US 6,810,361 B1
(45) Date of Patent: Oct. 26, 2004

(54) ESTIMATING UTILIZATION OF AN ELECTRONIC SYSTEM COMPONENT

(75) Inventor: Eric Anderson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 121 days.

(21) Appl. No.: 10/176,423

(22) Filed: Jun. 19, 2002

(51) Int. Cl.[7] .......................... G06F 11/30; G21C 17/00
(52) U.S. Cl. ...................... 702/186; 702/176; 702/187; 709/224
(58) Field of Search ......................... 702/108, 176–181, 702/186–188; 709/224; 710/15, 17, 18; 714/44, 47

(56) References Cited

U.S. PATENT DOCUMENTS

| | | | | | |
|---|---|---|---|---|---|
| 4,187,726 | A | * | 2/1980 | Olmstead ...................... | 73/660 |
| 5,371,689 | A | * | 12/1994 | Tatsuma ...................... | 702/186 |
| 5,845,310 | A | * | 12/1998 | Brooks ........................... | 711/3 |
| 5,991,705 | A | * | 11/1999 | Klein et al. .................. | 702/176 |
| 6,065,138 | A | * | 5/2000 | Gould et al. .................. | 714/47 |
| 6,345,337 | B1 | * | 2/2002 | McNutt et al. ............. | 711/133 |
| 6,370,686 | B1 | * | 4/2002 | Delo et al. ................... | 717/174 |
| 6,493,810 | B1 | * | 12/2002 | Pang et al. ................. | 711/170 |
| 2002/0087291 | A1 | * | 7/2002 | Cooper ........................ | 702/186 |
| 2003/0046383 | A1 | * | 3/2003 | Lee et al. .................... | 709/224 |

OTHER PUBLICATIONS

"An Experimental Assessment of Resource Queue Lengths as Load Indices", Songnian Zhou, Report No. UCB/CSD 86/298, Jun. 1986.

* cited by examiner

*Primary Examiner*—Marc S. Hoff
*Assistant Examiner*—Manuel L. Barbee

(57) ABSTRACT

Method and apparatus for estimating utilization of an electronic system component. Trace information that includes start times and completion times of operations resulting in access to the system component is gathered for a period of time. Using the start times and completion times of the trace information a total of time expended by the operations is generated. A component-occupancy value that indicates a ratio of the total time to the length of the period of time is then generated to indicate the occupancy of the component.

32 Claims, 3 Drawing Sheets

ESTIMATING UTILIZATION OF AN ELECTRONIC SYSTEM COMPONENT

FIELD OF THE INVENTION

The present invention generally relates to estimating utilization of components in an electronic system.

BACKGROUND

Knowledge of the level of resource utilization in computing systems is important for ensuring that users' needs are adequately serviced and computing resources are deployed where needed most. Example computing resources include components such as CPUs, memory, storage, and communications equipment. If a resource is currently fully utilized, users may experience performance degradation and the current configuration may not support additional users. On the other hand, if only a small portion of a resource is being utilized, services may be reassigned from an over-utilized resource to an underutilized resource.

The characteristics of a utilization metric depend on the resource in question. For example, an example metric of CPU utilization is the amount of time the CPU spends executing user and system programs divided by the total time spent by the CPU both idling and executing instructions. In terms of storage utilization, an example utilization metric is the quantity of storage in which user and system data are stored versus the total amount of storage available.

Prior solutions for estimating device utilization of storage systems, for example, are either complex or provide an incomplete view. One example prior solution requires hooks implemented at a low level in the storage system to obtain measurements directly from the device. Another example prior solution models storage system performance. However, models require significant development efforts. Still other prior solutions provide basic metrics such as I/O operations per second or bandwidth in Mbytes per second. While these basic metrics indicate a current performance level, system administrators may find other metrics more useful in selecting equipment and configuring the system.

A system and method that address the aforementioned problems, as well as other related problems, are therefore desirable.

SUMMARY OF THE INVENTION

In various embodiments, the invention provides a method and apparatus for estimating the utilization of an electronic system component. Trace information that includes start times and completion times of operations resulting in access to the system component is gathered for a period of time. Using the start times and completion times of the trace information the total amount of time expended by the operations is determined. A component-occupancy value that indicates a ratio of the total time value to the length of the period of time is then generated to indicate the occupancy of the component.

Various example embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

The present invention is described in terms of tracing the durations of input/output operations and using the total time of the durations to determine the occupancy of a component (s) accessed by the operations. It will be appreciated that the invention is not limited to input/output operations and could be applied to different types of operations that affect different resources of a computing arrangement.

In various embodiments, the start times and end times of selected operations of a computing arrangement are traced for a period of time ("trace period"). The operations are those that access a resource for which an occupancy metric is desired. From the start times and end times of the operations, a total amount of time is determined for which the resource was occupied during the trace period. The occupancy metric for the resource is a ratio of the total time to the length of the trace period.

It will be appreciated that the processing performed by the various embodiments of the invention can be implemented in a variety of configurations that depend on user-specific requirements and the operations being traced. For example, the trace information can be gathered and reported under the control of either centralized or distributed computer processes.

Figure 1:
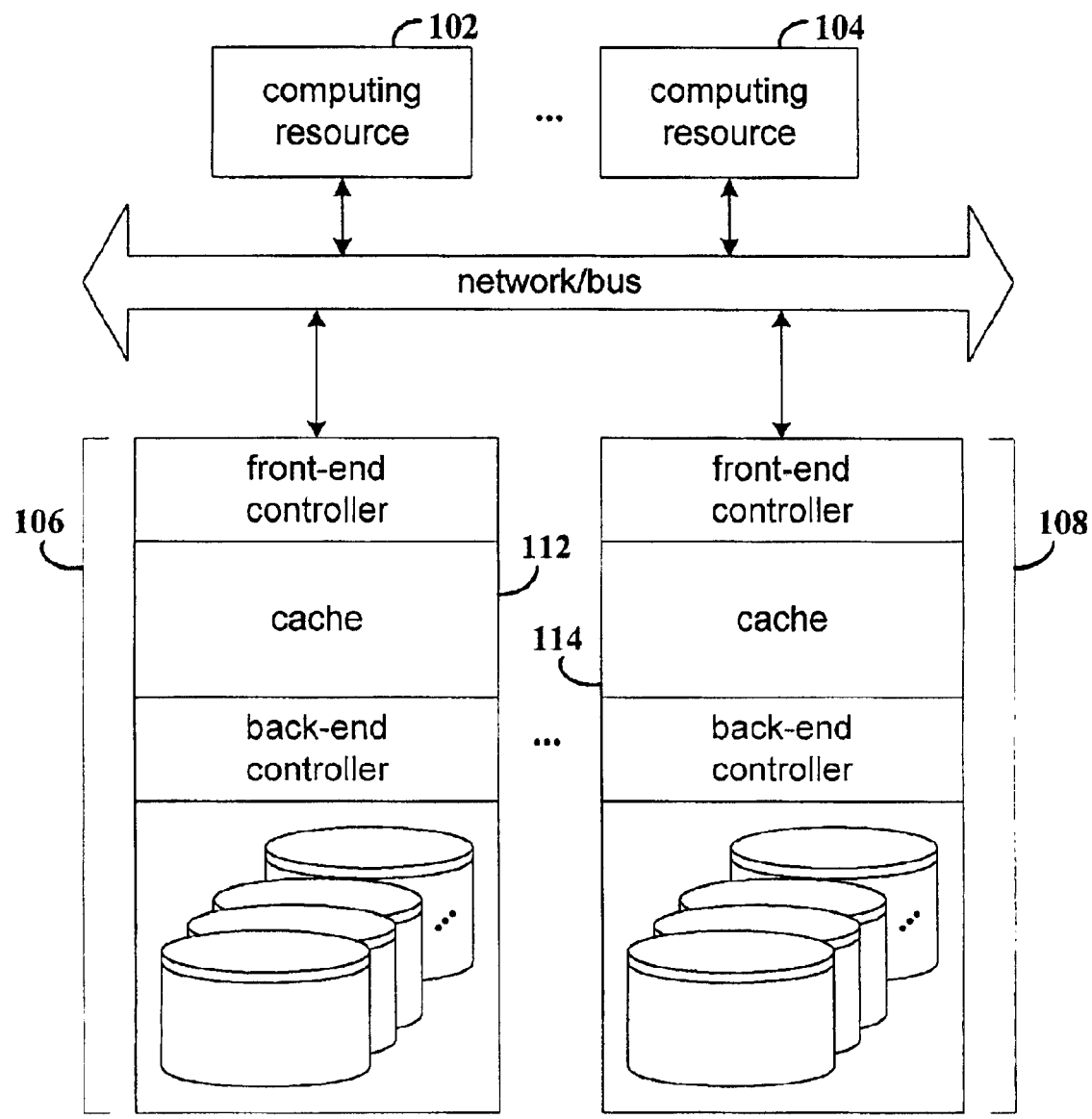
FIG. 1 is a functional block diagram of a computing arrangement including networked computing resources and storage resources.

FIG. 1 is a functional block diagram of an example computing arrangement including networked computing resources 102 and 104 and storage resources 106 and 108. Computing resources are, for example, workstations, or other class of machine hosting programs that require access to the networked storage resources. Storage resources 106 and 108 are network attached storage systems, for example. It will be appreciated that the invention is not limited to the arrangement of FIG. 1. For example, the invention is applicable to stand-alone computing arrangements coupled to a storage area network, a computing system with direct attached storage, and various other storage arrangements having retentive storage. The invention is also applicable to operations that affect resources other than storage resources, for example, network resources, database resources, web servers and other components associated with serving various types of network-accessible data objects.

The high-level components of each of storage resources 106 and 108 are illustrated to show how the occupancy metric is determined for a storage resource having a cache memory. Many retentive storage systems, such as disk storage systems, include a cache memory to improve performance. Data in the cache memory can be accessed much faster than data on the disks. Storage resource 106 includes cache memory 112, and storage resource 108 includes cache memory 114. In terms of input/output operations, an operation that references cached data ("cache-hit condition") will be of much shorter duration than an operation that references data not in cache memory ("cache-miss condition"). As shown and explained with FIG. 3, whether an operation hits or misses the cache can be determined from the respective durations of the operations. If the component for which the occupancy metric is being estimated is a particular array of disks, the input/output read operations resulting in cache-hits are not factored in to the occupancy metric for the disks ("back-end metric") because no access is made to the disks. However, a metric relating to the cache ("front-end metric") includes times spent by input/output read operations that hit the cache. This provides a more accurate estimation of occupancy than techniques that do not account for cache-hit conditions.

Input/output write operations to the disks that hit the cache memory will also be seen as having a short duration. However, for a write operation, the duration must be increased to account for the fact that the data will eventually be written to the disks after the operation is complete. In one embodiment, the durations of write operations hitting the cache memory are estimated based on a selected fixed value plus an amount that accounts for the size of the write operation. An example method to estimate a duration for write operations is to plot the size versus the time required to complete read operations that miss the cache ("back-end reads"), and then perform linear interpolation on the data points.

In another embodiment, respective occupancy values are generated for the different resources in the system. For example, the trace information may also include an identifier of the resource being accessed. From the trace information, the components accessed by the operations can be determined from system information. The system information includes mappings between identifiers, for example logical identifiers to physical components. The mappings may also be between different levels of identifiers. This allows identification of the particular components, for example, storage resources 106 and 108, in generating respective occupancy values.

Figure 2:
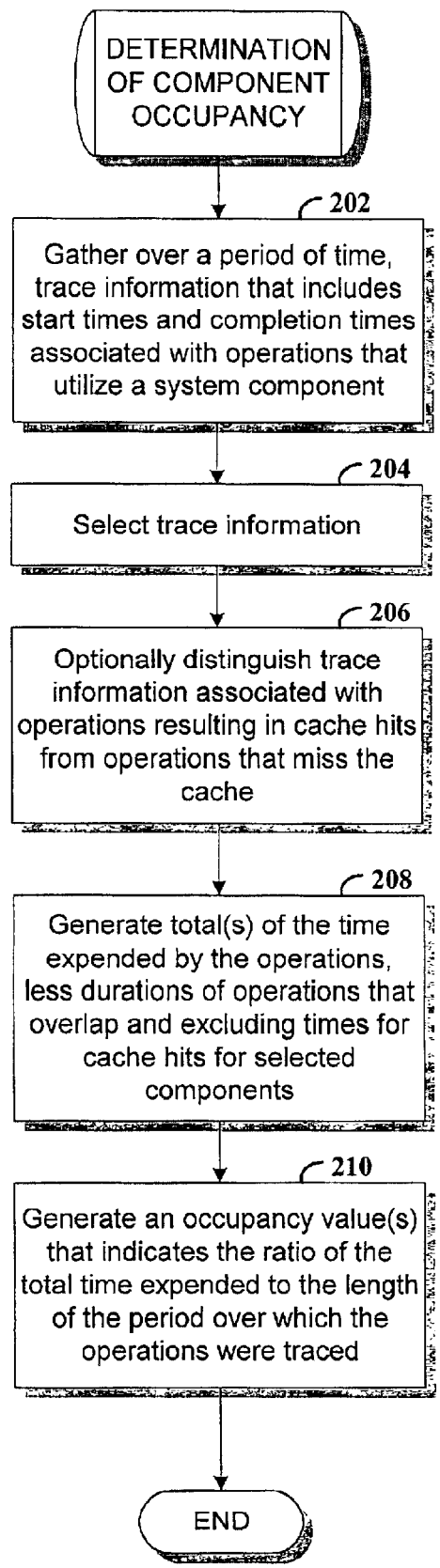
FIG. 2 is a flowchart of an example process for determining the occupancy of a component in an electronic system in accordance with one embodiment of the invention.

FIG. 2 is a flowchart of an example process for determining the occupancy of a component in an electronic system in accordance with one embodiment of the invention. Trace information is gathered for selected operations in a computing arrangement (step 202). The trace information includes respective start times and end times for the operations. In another embodiment, the trace information also characterizes the operation, for example, a read or a write operation, and includes associated identifiers of the sources of the operations. The particular operations for which the trace information is gathered, as well as the period of time for which the trace information is gathered, depends on the user's objectives. For example, to estimate storage utilization input/output operations are traced, and estimating network utilization might involve gathering trace information for network packets at the various nodes on the network. The period of time for which the operations are traced may be controlled by tracing for a selected number of operations. Alternatively, the trace period may be for a selected period of time. The mechanism that gathers the trace information is deployed at the level needed to observe the operations being traced. For example, in some operating systems input/output operations of a computing arrangement are observable via operating system routine calls.

After gathering the trace information, specific trace information is selected (step 204) according to the component(s) for which the occupancy metric is desired. In one embodiment, the trace information includes component identifiers that indicate the component accessed by the traced operations. A component identifier may reference a physical device or a logical component, depending on the traced operation. An example physical component is a particular storage resource (e.g., 106 or 108). Logical components include data objects such as logical volumes, databases, and files. When trace information that includes a logical component identifier is encountered, a system-provided mapping of logical components to physical components is consulted to obtain the identity of the physical device on which the logical component is stored. In addition, various components along the input/output path are also identified as being occupied by the operation. Thus, the trace information for a single operation provides the ability to determine occupancy values for all the components "occupied" by the operation.

If the traced operations involve a component that has an associated cache memory, then the trace information of operations resulting in cache hits is distinguished from the trace information from operations resulting in cache misses (step 206). If the operations do not involve a component having an associated cache memory, then this step is not performed. The description of FIG. 3 describes an example method for distinguishing between cache-hit and cache-miss input/output operations. For other types of resources, for example, a file resource, some systems generate status information that indicates cache-hit and cache-miss conditions in response to processing an input/output request.

Figure 4:
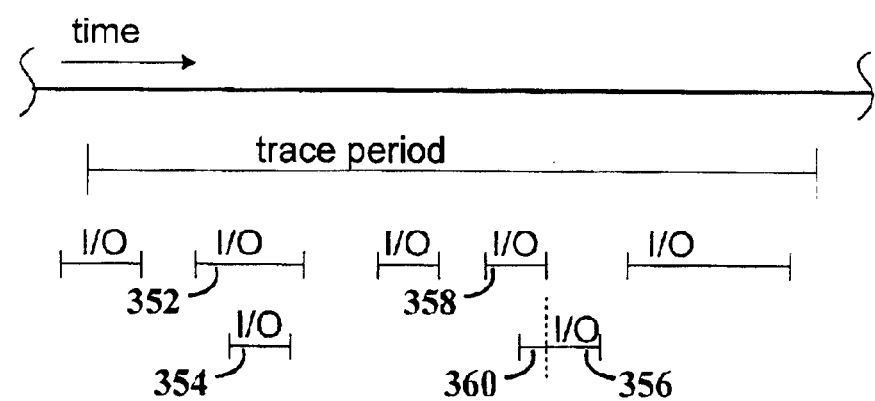
FIG. 4 illustrates a sequence of input/output operations during a period in which trace information is gathered for determining the occupancy of a component in terms of input/output operations.

The total time the component is occupied during the trace period is determined from the selected trace information (step 208). The total is the sum of differences between the start times and end times, less the durations of operations that overlap in time. FIG. 4 illustrates input/output operations that overlap.

In an example embodiment that traces input/output operations, the durations of the input/output operations are weighted in proportion to the number of bytes transferred. However, it will be appreciated that an operation's duration itself may reflect the number of bytes involved. Thus, weighting of operations may not be needed in some applications.

In another embodiment, input/output operations that write data to a storage resource and that hit a cache memory are treated differently from write operations that miss the cache memory. The durations of write operations that hit the cache memory are increased to account for the occupancy that will occur when the data is eventually written to storage. The duration of such operations is an estimated value based on a mean value of read operations of comparable size. In a further refinement, the estimated value is reduced by a factor (e.g., ½ or ⅓) to account for efficiencies of scheduling write operations.

The final step in determining the occupancy of a component is generating an occupancy value (step 210). The occupancy value is the ratio of the total time expended by the operations during the trace period to the duration of the trace period. In one embodiment, the ratio is expressed as a percentage. If multiple components are occupied by the traced and selected operations, respective occupancy values are generated for the components. That is, for each component I/O operations are selected that touch the component. The occupancy value for a component is the ratio of the total time expended by the selected operations to the duration of the trace period. Alternatively, instead of expressing the ratio in terms of the trace period, the occupancy value for a component can be expressed as the ratio of the total time expended by the selected operations to the duration of the time period that spans from the start time of the earliest operation on that component to the end time of the last operation on that component.

Figure 3:
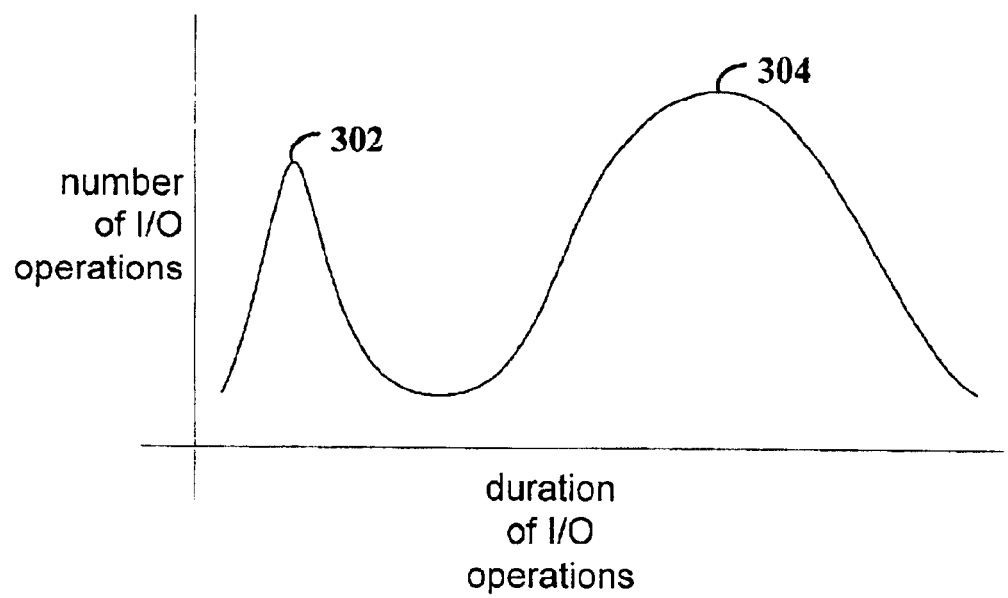
FIG. 3 is a graph of the duration of input/output operations versus the number of input/output operations.

FIG. 3 is a graph of the duration of input/output operations versus the number of input/output operations. The graph represents an example histogram of the durations of input/output operations. The example curve has two local maximum values, as identified by reference numbers 302 and 304. The two local maximum value are a result of the difference in durations of cache-hit operations and cache-miss operations. The cache-hit operations are clustered around local maximum value 302, and cache-miss operations are clustered around local maximum value 304. In an example embodiment of the present invention, a threshold value is determined relative to the two local maximum values. Operations having durations less than (alternatively, <=) the threshold value are considered cache-hit operations, and operations having durations greater than or equal to (alternatively, >) the threshold value are considered cache-miss operations.

In one embodiment, a histogram is constructed for the operations and durations. There are various methods for determining the two maximum values. For example, in a course granularity histogram (e.g., 1 millisecond) the two highest values that are separated by a selected amount of time (e.g., 5 milliseconds) are identified as the maximum values. Alternatively, in a finer granularity histogram, curve fitting and root finding techniques can be applied to find the curve maximum values. Once the two local maximum values are identified, the duration that is at the midpoint between the two local maximum values is established as the threshold value.

FIG. 4 illustrates a sequence of input/output operations during a period in which trace information is gathered for determining the occupancy of a component in terms of input/output operations. The durations for which operations overlap in time is not counted in the total occupancy. For example, operations 352 and 354 overlap, with operation 354 beginning and ending in the interval that operation 352 is active. Thus, the duration of operation 354 is not counted at all in accumulating the total occupancy.

Operations 356 and 358 also overlap. However, only a portion of operation 358 overlaps operation 356. Thus, only the portion 360 of overlap is not counted in the total occupancy.

In addition to the example embodiments described above, other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer implemented method for estimating utilization of an electronic system component, wherein the system includes a plurality of components and includes a mapping of component identifiers in a first set to components identifiers in a second set, and the components of the system include a data source and an associated cache, comprising:
   gathering for a period of time, trace information that includes start times and completion times of operations resulting in access to the system component, wherein each operation accesses a component and is directed to the data source, and the trace information further includes component identifiers of components accessed by the operations;
   determining which components are accessed using the component identifiers in the trace information and the mapping of component identifiers in the first set to component identifiers in the second set;
   determining from the trace information whether each operation resulted in a cache-hit or a cache-miss condition:
   generating from the start times and completion times of the trace information a total time expended by the operations, excluding the start time and completion time of each operation resulting in a cache-hit condition; and
   generating a plurality of component-occupancy values, wherein each component-occupancy value is associated with one of the components and indicates a ratio of the total time to the length of the period of time.

2. The method of claim 1, wherein the period of time is for a selected duration.

3. The method of claim 1, wherein the period of time starts at a selected time and ends upon the occurrence of a selected number of operations.

4. The method of claim 1, wherein the operations are database queries.

5. The method of claim 1, wherein the operations are network packets.

6. The method of claim 1, wherein the operations are requests for a network-accessible data object.

7. The method of claim 1, wherein the operations are input/output operations directed to a retentive storage system.

8. The method of claim 1, wherein the operations are input/output operations.

9. The method of claim 8, further comprising:
   determining individual I/O-time values for the input/output operations as a function of respective start times and completion times;
   identifying as fast-write operations input/output operations that specify writing to the disk and having individual I/O-time values less than a selected threshold; and
   increasing the individual I/O-time values of the fast-write operations by a selected value.

10. The method of claim 1, further comprising:
    wherein the operations are input/output operations, and the trace information associated with each input/output operation includes a quantity value that quantifies data associated with the input/output operation;
    generating respective weight values for the input/output operations as a function of the quantity values; and
    determining individual I/O-time values for the input/output operations as a function of respective start times, completion times, and weight values, wherein the total I/O-time value is a function of the individual IO-time values.

11. The method of claim 1, further comprising:
    wherein the trace information further identifies sources from which the respective operations were initiated;
    identifying sources that initiated the operations;
    for each source, computing from the start times and completion times of the device-specific information, respective total time values, each total time value being a total of time expended by the operations associated with the device and initiated by a source; and
    outputting a plurality of device-occupancy values that indicate ratios of the total time values to the length of the period of time.

12. A computer implemented method for estimating utilization of an electronic system component, wherein the system includes a plurality of components and includes a mapping of component identifiers in a first set to components identifiers in a second set, the method comprising:

gathering for a period of time, trace information that includes start times and completion times of operations resulting in access to the system component, wherein each operation accesses a component, and the trace information further includes component identifiers of components accessed by the operations;

determining which components are accessed using the component identifiers in the trace information and the mapping of component identifiers in the first set to component identifiers in the second set;

generating from the start times and completion times of the trace information a total time expended by the operations; and generating a plurality of component-occupancy values, wherein each component-occupancy value is associated with one of the components and indicates a ratio of the total time to the length of the period of time.

13. The method of claim 12, wherein the operations are database queries.

14. The method of claim 12, wherein the operations are network packets.

15. The method of claim 12, further comprising:

determining individual time values for the operations as a function of respective start times and completion times;

creating a histogram of time values for operations;

identifying from the histogram two local maximum time values;

selecting a threshold value between the two local maximum time values; and identifying operations having time values less than the selected threshold as operations resulting in cache-hit conditions.

16. An article of manufacture for estimating utilization of an electronic system component, wherein the system includes a plurality of components and includes a mapping of component identifiers in a first set to components identifiers in a second set, and the components of the system include a data source and an associated cache, comprising:

a computer-readable medium configured with program instructions for causing a computer to perform the steps of, gathering for a period of time, trace information that includes start times and completion times of operations resulting in access to the system component, wherein each operation accesses a component and is directed to the data source, and the trace information further includes component identifiers of components accessed by the operations;

determining which components are accessed using the component identifiers in the trace information and the mapping of component identifiers in the first set to component identifiers in the second set;

determining from the trace information whether each operation resulted in a cache-hit or a cache-miss condition;

generating from the start times and completion times of the trace information a total time expended by the operations, excluding the start time and completion time of each operation resulting in a cache-hit condition; and generating a plurality of component-occupancy values, wherein each component-occupancy value is associated with one of the components and indicates a ratio of the total time to the length of the period of time.

17. The article of manufacture of claim 16, wherein the period of time is for a selected duration.

18. The article of manufacture of claim 16, wherein the period of time starts at a selected time and ends upon the occurrence of a selected number of operations.

19. The article of manufacture of claim 16, wherein the operations are database queries.

20. The article of manufacture of claim 16, wherein the operations are network packets.

21. The article of manufacture of claim 16, wherein the operations are requests for a network-accessible data object.

22. A computer implemented method for estimating utilization of an electronic system that includes a plurality of components, including at least one data source and an associated cache, comprising:

gathering for a period of time, trace information that includes start times and completion times of operations resulting in access to the system component, wherein the operations are directed to the data source;

determining from the trace information whether each operation resulted in a cache-hit or a cache-miss condition;

generating from the start times and completion times of the trace information a total time expended by the operations, excluding the start time and completion time of each operation resulting in a cache-hit condition; and generating a component-occupancy value that indicates a ratio of the total time to the length of the period of time.

23. The method of claim 22, further comprising:

determining individual time values for the operations as a function of respective start times and completion times;

creating a histogram of time values for operations;

identifying from the histogram two local maximum time values;

selecting a threshold value between the two local maximum time values; and identifying operations having time values less than the selected threshold as operations resulting in cache-hit conditions.

24. The method of claim 22, wherein the operations are input/output operations.

25. The method of claim 24, further comprising:

determining individual I/O-time values for the input/output operations as a function of respective start times and completion times;

identifying as fast-write operations input/output operations that specify writing to the disk and having individual I/O-time values less than a selected threshold; and increasing the individual I/O-time values of the fast-write operations by a selected value.

26. The method of claim 22, further comprising:

wherein the trace information further identifies sources from which the respective operations were initiated;

identifying from the trace information sources that initiated the operations;

for each source, computing from the start times and completion times of the device-specific information, respective total time values, each total time value being a total of time expended by the operations associated with the device and initiated by a source; and outputting a plurality of device-occupancy values that indicate ratios of the total time values to the length of the period of time.

27. A program storage device for use in estimating utilization of an electronic system that includes a plurality of components, including at least one data source and an associated cache, comprising:

a processor-readable program storage device including instructions that are executable by a processor for performing the steps including, gathering for a period of time, trace information that includes start times and completion times of operations resulting in access to the system component, wherein the operations are directed to the data source;

determining from the trace information whether each operation resulted in a cache-hit or a cache-miss condition;

generating from the start times and completion times of the trace information a total time expended by the operations, excluding the start time and completion time of each operation resulting in a cache-hit condition; and generating a component-occupancy value that indicates a ratio of the total time to the length of the period of time.

28. The program storage device of claim 27, wherein the processor-readable program storage device is further configured with instructions for performing the steps including, determining individual time values for the operations as a function of respective start times and completion times;

creating a histogram of time values for operations;

identifying from the histogram two local maximum time values;

selecting a threshold value between the two local maximum time values; and identifying operations having time values less than the selected threshold as operations resulting in cache-hit conditions.

29. The program storage device of claim 27, wherein the operations are input/output operations.

30. The program storage device of claim 29, wherein the processor-readable program storage device is further configured with instructions for performing the steps including, determining individual I/O-time values for the input/output operations as a function of respective start times and completion times;

identifying as fast-write operations input/output operations that specify writing to the disk and having individual I/O-time values less than a selected threshold; and increasing the individual I/O-time values of the fast-write operations by a selected value.

31. The program storage device of claim 27, wherein the processor-readable program storage device is further configured with instructions for performing the steps including, wherein the trace information further identifies sources from which the respective operations were initiated;

identifying from the trace information sources that initiated the operations;

for each source, computing from the start times and completion times of the device-specific information, respective total time values, each total time value being a total of time expended by the operations associated with the device and initiated by a source; and outputting a plurality of device-occupancy values that indicate ratios of the total time values to the length of the period of time.

32. An apparatus for estimating utilization of an electronic system that includes a plurality of components, including at least one data source and an associated cache, comprising:

means for gathering for a period of time, trace information that includes start times and completion times of operations resulting in access to the system component, wherein the operations are directed to the data source;

means for determining from the trace information whether each operation resulted in a cache-hit or a cache-miss condition;

means for generating from the start times and completion times of the trace information a total time expended by the operations, excluding the start time and completion time of each operation resulting in a cache-hit condition; and means for generating a component-occupancy value that indicates a ratio of the total time to the length of the period of time.

* * * * *